United States Patent [19] [11] 3,928,110
Arconti et al. [45] Dec. 23, 1975

[54] FILM BONDING USING A SOLVENT SATURATED CLOTH WICK

[75] Inventors: Richard J. Arconti, Akron; Robert M. Pierson, Hudson, both of Ohio

[73] Assignee: The Goodyear Tire & Rubber Company, Akron, Ohio

[22] Filed: Mar. 11, 1974

[21] Appl. No.: 450,035

[52] U.S. Cl. ............... 156/308; 156/313; 428/238; 428/322; 428/480; 428/520
[51] Int. Cl.² ...... C09J 5/02; B32B 7/10; B32B 5/02
[58] Field of Search ...... 156/308, 313, 307; 161/88, 161/101, 161; 428/123, 238, 322, 480, 520

[56] References Cited
UNITED STATES PATENTS

| | | | |
|---|---|---|---|
| 3,301,731 | 1/1967 | Ruskin et al. | 156/293 |
| 3,765,983 | 10/1973 | Putzier | 156/293 |
| 3,811,980 | 5/1974 | Roderhoff | 156/308 |
| 3,834,965 | 9/1974 | Seiwert et al. | 156/294 |

*Primary Examiner*—Douglas J. Drummond
*Assistant Examiner*—Robert A. Dawson
*Attorney, Agent, or Firm*—F. W. Brunner; H. C. Young, Jr.

[57] ABSTRACT

This invention relates to a method for the bonding of films comprising saturating a piece of fabric with a solvent capable of rapid interpenetration of the film surface, placing the fabric containing the solvent between the edges of two film sheets, applying pressure and drying the laminate to complete the bond.

2 Claims, No Drawings

FILM BONDING USING A SOLVENT SATURATED CLOTH WICK

The present invention relates to a process for bonding films. More particularly it relates to an improved method for the bonding of these films by the use of solvents.

The bonds produced by the processes of this invention are stronger than the tensile strength of the film itself, have good appearance and are easily applied by machine or hand. Such bonds are useful in any application requiring such films to be joined together as in inflatable buildings, inflatable boats and pond liners.

Film bonds have heretofore been formed by the use of thermal sealing and solvent sealing methods. Thermal sealing has been accomplished using machines which heat one or both films to be joined, melting and flowing together the two sheets to form a unit bond. Often the films bunch and pucker, giving a finish bond with a bad appearance and permitting the passage of air and water. Thermal bonding requires expensive equipment which is usually fixed in place and not movable to a field site for repair or replacement.

Solvent bonding of films has been largely unsatisfactory because of the difficulty in evenly controlling the deposit of solvent on the film. The finished bond often has a puckered appearance and will not stop the passage of air or water. Most of the effectiveness of the solvent is lost because the solvent is squeezed out by the pressure necessary for a good bond.

It is an object of the present invention to provide a method for the bonding of polyvinylchloride films. It is a further object of the present invention to provide a method for the bonding of polyester film. Other objects will become apparent to those skilled in this art as the description proceeds.

The objects of this invention are accomplished by dipping a cloth into a suitable solvent, placing the saturated cloth which acts as a wick between the edges of the film sheets to be bonded forming a laminate, applying pressure along the wick and drying the laminate to complete the bond. The wick holds the solvent in position allowing interpenetration of the two film surfaces and upon formation of the bond becomes a part of the bond itself, leaving no interstices where tearing or separation can begin. Such a bond is stronger than the original film. The wick allows a uniform deposit of solvent and gives a finished bond which is smooth with good appearance and high strength. Film can be bonded using this method by machine or by hand. Proper selection of solvent allows a quick initial grab while the use of a wick allows more time for the solvent to make the bond.

Representative examples of solvents useful for bonding of polyvinylchlorides are tetrahydrofuran, methyl ethyl ketone, acetone, diethyl ketone and methyl propyl ketone. Representative examples of solvents useful for bonding polyesters are hexafluoroisopropanol, methylene dichloride and hexafluoroacetonesesquihydrate. Any solvent having the requisite properties of rapid interpenetration and controlled evaporation can be used. Combinations of these solvents can be used.

The process of this invention is applicable to any film for which a suitable solvent can be found. The processes of this invention allow the bonding of films to a rigid, non-flexible article having the same or similar composition as the film. For example, a polyvinylchloride film can be bonded to a rigid polyvinylchloride member using a polyvinylchloride wick saturated with tetrahydrofuran.

The invention will be more particularly described in reference to the examples below in which parts and percentages are by weight unless otherwise specified.

EXAMPLE 1

A 1 inch wide strip of woven polyvinylchloride cloth was saturated in tetrahydrofuran and placed on a polyvinylchloride film one-fourth inch from the edge to be bonded. Immediately a second polyvinylchloride film was placed over the saturated cloth wick with a one-fourth inch overlap. Pressure ranging from 10 to 100 pounds per square inch was applied longitudinally along the edge of the composite laminate until the initial "grab" or bond formation occurred. The bond was allowed to dry at ambient temperature for 3 to 5 minutes.

One inch by 6 inch tensile strips were died out transverse to the seam formed by the bond with the bond area in the center of the tensile strip. Tensile measurements were made in accordance with ASTM D-882-67 (determination of tensile properties of plastics in the form of thin sheeting, method A). Tensile breaks occurred in the film portion and not at the bond in all cases.

EXAMPLE 2

A piece of cotton "cheesecloth" was used as a wick and tested in the same manner as described in Example 1. The bond proved to be of good strength. Tensile measurements showed the breaks to occur outside the bonded area.

EXAMPLE 3

A one inch wide piece of non-woven polyvinylchloride cloth was saturated in tetrahydrofuran. A test sample of laminate of polyvinylchloride film was made and tested as described in Example 1. Bond failure occurred during tensile testing. The failure showed the bond strength was less than the tensile strength of the film.

The failure observed in Example 3 illustrates that a woven wick is preferable to a non-woven wick. Bond strength is improved if the cloth wick is of the same or similar composition as the films to be bonded. Other woven cloth wicks find varying degrees of success but do not become an integral part of the bond.

The use of the wick in the solvent bonding allows a controlled amount of solvent to be applied to the area of the bond. The amount of solvent is controlled by the length of time the wick is dipped in the solvent, the amount of time elapsed between removal from the solvent and application to the film, the thickness of the fabric and the number of interstices in the fabric. The amount of time the wick is in the solvent can range from 15 seconds to 5 minutes. Generally from about 20 seconds to one minute will be used.

The amount of pressure applied depends on the strength of the solvent used. Normally pressures from one to 100 pounds per square inch will be used with pressures from 25 to 75 pounds per square inch being preferred.

The term "polyester" as employed herein is intended to include homopolyester and copolyester.

Representative examples of polyesters are poly(ethylene terephthalate), poly(tetramethylene terephthalate), 80/20 poly(tetramethylene terephthalate/isophthalate) and 70/10/20 poly(tetramethylene/isophthalate/sebacate).

The term "polyvinylchloride" as employed herein is intended to include homopolymers and copolymers.

Representative examples of such polymers are amorphous polyvinylchloride and crystalline polyvinylchloride. Representative examples of copolymers are vinylchloride/ethyl acetate; vinylchloride/vinyl acrylate; vinylchloride/diethyl maleate; vinylchloride/dibutyl maleate; and vinylchloride/vinylidene chloride. Copolymers other than those named can be used.

Use of a cloth wick having the same composition as the film provides a permanent bond without distortion of the bonded material. The process is less expensive than heat sealing both in capital expense and power consumption. The process described in the present invention can be run continuously if desired. Because of the simplicity and ease with which the process is carried out, expensive and elaborate equipment is not required.

This process can also be used for bonding film to a rigid member of the same composition as the film. In making this type of finished bond, generally a saturated wick is placed on the rigid member, the wick is overlapped by the film, and pressure is applied longitudinally along the wick and the laminate dried to complete the bond.

While certain representative embodiments and details have been shown for the purpose of illustrating the invention, it will be apparent to those skilled in this art that various changes and modifications may be made therein without departing from the spirit or scope of the invention.

We claim:

1. In a method for bonding films selected from polyvinylchloride and polyesters, using a solvent, the improvement which comprises:
    a. saturating a cloth wick with a solvent capable of rapid interpenetration of the film surface,
    b. placing the saturated wick between overlapping edges of the film, and
    c. applying pressure until the bond forms, where said cloth wick is polyvinylchloride when said film is polyvinylchloride, and where said cloth wick is polyester when said film is polyester.

2. The method of claim 1 where, when said film is polyvinylchloride, said solvent is selected from tetrahydrofuran, methyl ethyl ketone, diethyl ketone, acetone and methyl propyl ketone, and where, when said film is polyester, said solvent is selected from hexafluoroisopropanol, methylene dichloride and hexafluoroacetonesesquihydrate.

* * * * *